Figure 1:
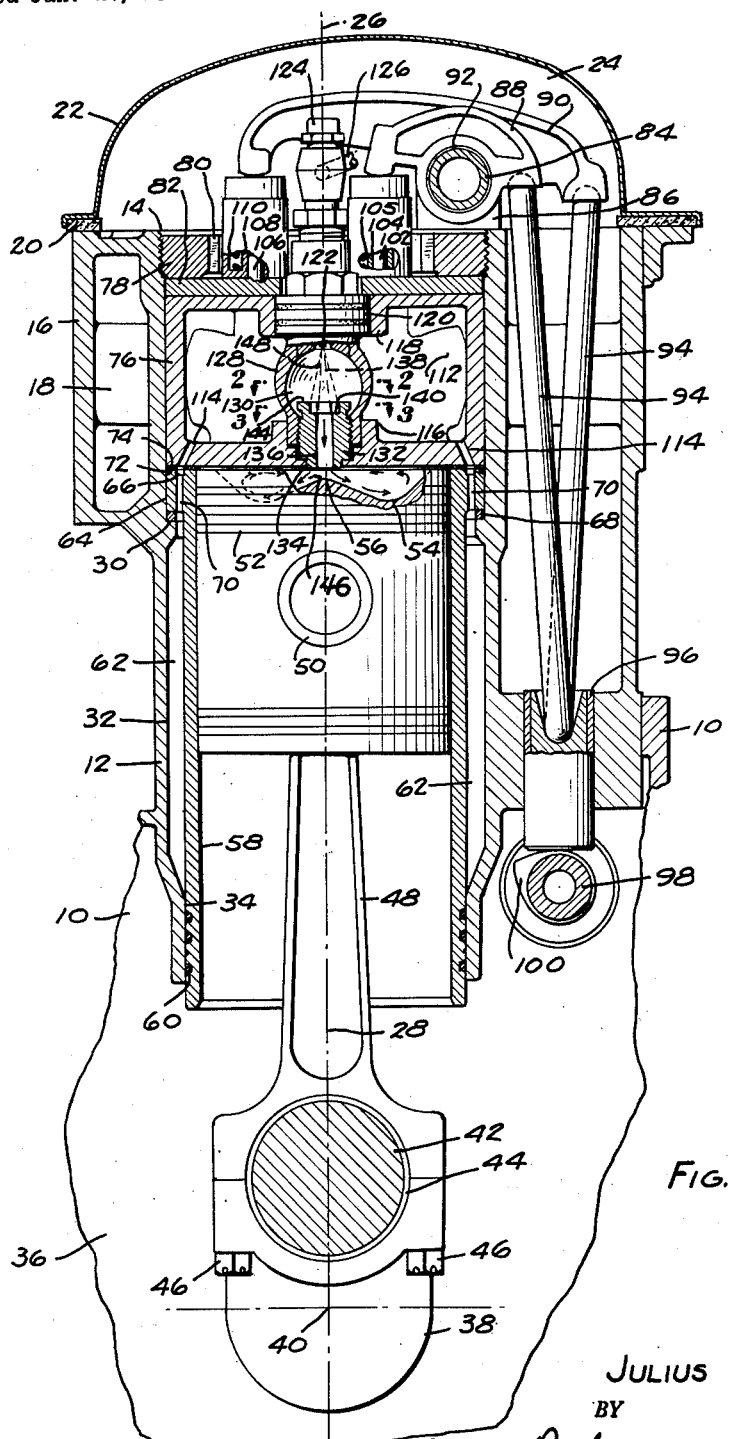

May 13, 1958

J. E. WITZKY 2,834,328

INTERNAL COMBUSTION ENGINE

Filed Jan. 27, 1954

2 Sheets-Sheet 1

INVENTOR:
JULIUS E. WITZKY
BY
Wilson, Redrow, and Gaines
ATTORNEYS.

May 13, 1958 J. E. WITZKY 2,834,328
INTERNAL COMBUSTION ENGINE
Filed Jan. 27, 1954 2 Sheets-Sheet 2

INVENTOR:
JULIUS E. WITZKY
BY
Wilson, Redrow, and Gaines
ATTORNEYS

United States Patent Office 2,834,328
Patented May 13, 1958

2,834,328

INTERNAL COMBUSTION ENGINE

Julius E. Witzky, Royal Oak, Mich., assignor to Studebaker-Packard Corporation, a corporation of Michigan Application January 27, 1954, Serial No. 406,415

17 Claims. (Cl. 123—32)

The present application relates to internal combustion engines and more especially to pre-combustion and combustion chambers for such engines.

An object of the invention herein presented is to provide novelly coacting pre-combustion and combustion chambers in internal combustion engines, which chambers coact to reduce firing lag during the engine cranking operation and which also produce improvements in the subsequent running characteristics of the engine under load.

It is a further object of the invention to provide pre-combustion and combustion chambers which are so associated as to promote more complete and rapid controlled-combustion of the fuel.

Another object is to provide, in a multi-cylinder internal combustion engine having a fuel-receiving pre-combustion chamber in each cylinder arranged to fire and discharge flaming fuel into the main combustion chamber thereof, an adaptive fitting located at the discharge side of the pre-combustion chamber having terraced sharp cornered surfaces which create turbulence and eddies contributing to improved atomization and mixing of the fuel particles and to a more complete combustion than is otherwise obtainable.

Another object of the invention is to provide, in a multi-cylinder internal combustion engine incorporating fuel-consuming individual pre-combustion chambers for the cylinders each having an outlet leading into the main combustion chamber of the corresponding cylinder, an adaptive fitting having a tubular upstanding end disposed in each pre-combustion chamber outlet to form local uncooled hot spots aiding in volatilizing the spray droplets of the fuel preparatory to being sprayed into the main combustion chamber. According to a feature of the invention the engine under normal running conditions experiences a more complete and positive combustion process owing to the more complete volatilization of the sprayed droplets of fuel.

A further object is the provision of a cylinder construction for a fuel fired internal combustion engine arranged to have a pre-combustion chamber into which a spray jet of fuel is directed and out of which a discharge communication leads to a main combustion chamber, wherein the precombustion chamber has a discharge fitting which is coaxial with respect to the spray jet and during cranking permits unimpeded passage of the core of the jet directly toward and straight into the main combustion chamber where ignition can spontaneously occur forthwith.

An additional object of the invention is the provision of a piston engine arrangement incorporating a single passage type precombustion chamber above and a piston below the main combustion chamber, wherein the piston forms the bottom side of the latter chamber and in its uppermost position presents an upstanding tapered boss which is coaxial with and opposite to the sole discharge passage from the precombustion chamber and thus in its function symmetrically splits up the discharge jet in the combustion chamber into toroidally outwardly propagating streams.

Another object is the provision of a diesel engine having precombustion and main combustion chambers incorporating a stationary, threadably held adaptive fitting therebetween, in which a hollow interior formed therein establishes continuous communication between the chambers and in which a sharp cornered tool-receiving socket at the precombustion end of the hollow interior provides the dual functions of creating fuel atomizing eddies and swirls during operating time of the engine and of receiving an installation tool for tightly but readily drawing down the fitting stationarily into its receiving threads during down-time servicing of the engine.

Figure 2:
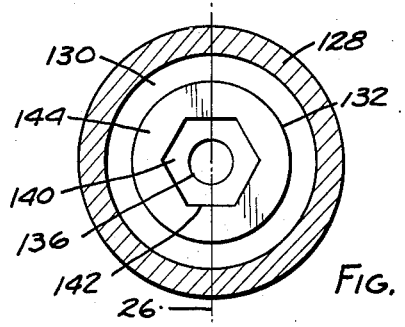
Figure 3:
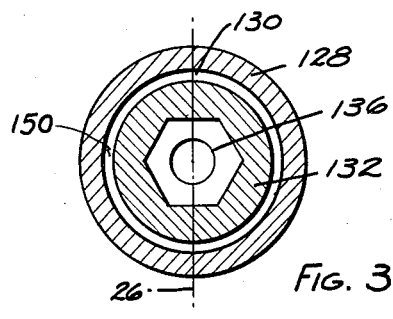
Figure 4:
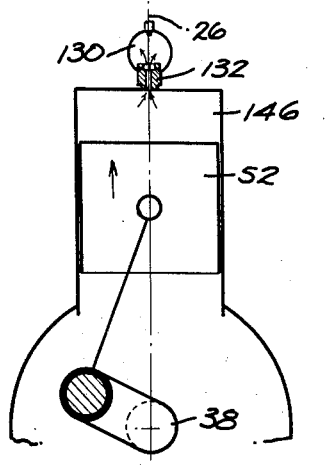
Figure 5:
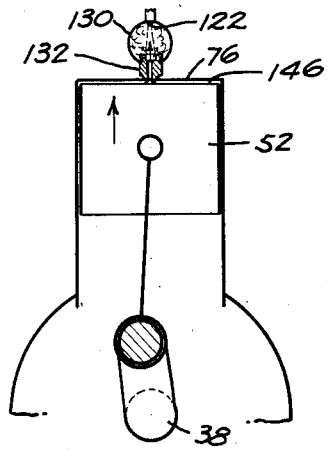
Figure 6:
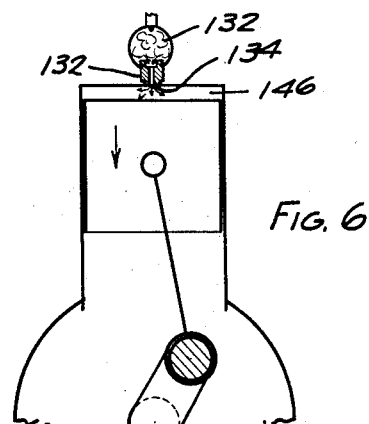

Further features, objects and advantages will either be specifically pointed out or become apparent when, for a better understanding of the invention, reference is made to the following written description taken in conjunction with the accompanying drawings in which Figure 1 is a transverse section in elevation through a multi-cylinder internal combustion engine to which the invention is shown applied;

Figures 2 and 3 are respective sections in plan taken along the lines 2—2 and 3—3 in Figure 1; and Figures 4, 5 and 6 are sequential diagrammatic views illustrating an operating phase in the engine cycle.

In Figures 1, 2, and 3 of the drawings, a multi-cylinder internal combustion diesel engine 10 is shown having one or more banks of identical inline cylinders one of which is indicated at 12 and is provided at its upper or outer end with a screw threaded mouth 14. The open upper end of each cylinder 12 as indicated at 16 surrounds the mouth 14 and is internally passaged thereabout to provide a water cooling jacket or chamber 18. Atop the cylinder 12 a sealing gasket 20 is clamped thereagainst by a flanged cover 22 which is secured to the upper end of the cylinder by means of a plurality of bolts or other fasteners, not shown. The cover 22 cooperates with the individual ends 16 of the cylinders to define a continuous generally longitudinally extending valve chamber 24 which is centrally intersected by the longitudinal plane of the cylinders which is indicated at 26 and which contains the individual principal axis 28 of each cylinder 12. At an intermediate portion therewithin, each cylinder 12 is formed in an inwardly directed annular ledge defining a transverse seat or shoulder 30 and is further formed with an annular recess 32 which is bounded at the top end thereof by the just-noted ledge and at the bottom end thereof by a beveled shoulder of revolution tapering diagonally outwardly from a smooth cylindrical surface 34.

The block 10 includes a crank case chamber 36 in which a multiple throw crank shaft 38 is set to rotate in appropriate main bearings, not shown. The crank shaft 38 and main bearings define a common principal longitudinal axis of rotation 40 which is contained in the plane of the cylinders 26 and each one of a plurality of crank shaft throws such as at 42 is mounted to orbit about the axis 40 due to crankshaft rotation. The parts of a two-part connecting rod bearing 44 are bolted together by a plurality of fasteners 46 so as to form a bearing about the throw 42 and they thus pivotally secure a ribbed connecting rod 48 at its lower end to the throw 42 and to crank shaft 38. At its upper end the piston rod 48 is secured by means of a piston pin 50 to a ring-fitted and sealed reciprocal piston 52 which has a recessed annular depression at 54 in the head thereof disposed symmetrically about a central boss 56 protruding upwardly from the piston head.

Mounted within the cylinder 12 and slidably receiving the ring-fitted piston 52, a wet-type tubular cylinder liner 58 is provided which at its inner or lower end has a plurality of O ring receiving grooves 60 which seal the same to the opposed cylindrical surface 34 in the cylinder 12. The walls of the liner 58 cooperate with the recess 32 in the cylinder to form a water jacket or chamber 62 which surrounds the cylinder and directly communicates longitudinally with the corresponding water jacket of each of the adjacent cylinders 12. The upper end of the liner 58 has a radially outwardly extending flange 64 which has an annular groove 66 formed in the upper surface thereof. The flange 64 is sealed as at 68 to the shoulder 30 and immediately adjacent but inwardly of the thus sealed surface of the flange 64 a plurality of vertically extending individual passages 70 is formed which define a cylindrical path of revolution about the axis 28. The passages 70 are equally circumferentially spaced apart one from the other and intersect the bottom of the annular groove 66; in one contemplated physical embodiment of the invention these passages 70 numbered thirty-three in the aggregate.

The liner flange 64 is beveled at its outer periphery to receive an O ring seal 72 which bears against the smooth walls at the upper end of the cylinder 12 and a sealing gasket 74 is provided which rests on the flange 64 at locations on each side of the groove 66. The gasket 74 is clamped to the flange 64 through the medium of an individual cylinder head 76 for the cylinder 12 and a retainer nut 78 therefor which is threadably held in the threads 14 in the cylinder mouth. Each nut 78 has a set of internal splines 80 adapted to receive a wrench or appropriate tool for drawing down the nut 78 and the head 76 tight against the gasket 74, the flange 64, the seal 68, and the shoulder 30. A centrally apertured interposed spacer ring 82 may be provided if desired between the nut 78 and the top surface of the head 76. A valve rocker shaft 84 is set in appropriate pedestal bearings as at 86 which are stationarily mounted to the upper ends 16 of the cylinders. A plurality of alternating short rocker arms 88 and long rocker arms 90 is journaled on appropriate bearings as at 92 which are supported on the rocker arm shaft 84 and provide for oscillatory movement of the rocker arms in known manner.

A set of overhead valve type push rods 94 is appropriately received in individual zero-lash lifters 96 which are operated from a common lobed cam shaft 98. The cam shaft 98 is chain driven from the crank shaft 38 at one-half crank shaft speed in known manner.

Each of the short rocker arms 88 operates an exhaust valve 102 through the medium of a pair of telescoping tappet cups which cooperate to define a valve guide 104 and a collapsible spring containing chamber 105. In similar fashion the long rocker arm 90 operates an intake valve 106 through the medium of a pair of telescoping cups which define a valve guide 108 and a collapsible spring containing chamber 110. The valves 102 and 106 extend through appropriate openings in the spacer plate 82 and the head 76 to a position above the piston where they control respective exhaust and inlet ports, not shown.

In the preferred form of the invention two inlet valves 106 are provided per cylinder and two exhaust valves 102 are provided per cylinder. The head 78 is hollow in the interior for cooling purposes and defines a water chamber 112 at the bottom of which there is formed a plurality of open-ended passages 114 which conduct cooling water between the chamber 112 and the annular groove 66 in the liner flange 64.

In one contemplated form of the invention, the passages 114 numbered thirty in the aggregate and conformed to a frusto-conical path of revolution about the central axis 28 of the cylinder. Centrally of the chamber 112 a pair of centrally open cylindrical bosses 116, 118 is provided which extend toward one another in vertically spaced apart relationship. The central opening in the upper boss at 118 sealingly receives the outer barrel of a nozzle 120 whose spray tip is shown at 122. The nozzle 120 is supplied from a suitable fuel inlet fitting 124 with which an appropriate by-pass or drain passage 126 is associated for cooling and control purposes. The outer barrel 120 of the nozzle has an integral depending portion 128 at the lower end which bridges between and internally engages the upper and lower bosses 116, 118 and defines a pre-combustion chamber 130 generated on the inside according to an exact spherical contour.

The pre-combustion chamber portion 128 is sealed at its lower end by an appropriate gasket to a ledge formed within the lower boss 116 and has a set of internal threads in which a tubular upstanding part or fitting 132 is threadably engaged. The tubular upstanding part 132 protrudes at its lower end 134 so as to be slightly below the level of the head 76 and the sealing gasket 74 and is formed centrally thereof with a smooth-bored through passage 136 which is arranged concentrically with respect to the cylindrical axis 28 and axially aligned with the tip 122 of the spray nozzle but on an opposite side of the spherical pre-combustion chamber 130 from the latter. The arrangement produces the result that during the cranking operation of the engine the core of the jet sprayed from the nozzle and indicated at 138 proceeds directly down the passage 136 which as shown is of uniform cross-section throughout its length.

The length to diameter ratio of the smooth-bored passage 136 according to one contemplated embodiment of the invention was approximately 4 to 1, where the length of the passage was 1 3/16 inches and the inside diameter or effective axial length of the pre-combustion chamber 130 was 1 1/2 inches.

At its upper end the passage 136 emerges in the floor 140 of a hexagonally shaped tool receiving recess 142 useful to advantage during the insertion and removal of the tubular part 132 with respect to the depending part 128 in which it is threadably held. The level of the floor 140 is predetermined in its relation to the tubular part or fitting 132 such that when the latter is installed in its final position the floor 140 is above the level of engagement between the threads of the tubular fitting 132 and the pre-combustion chamber portion 128 with the result that a considerable portion of the tubular part 132 is upstanding within and unengaged with the walls of the pre-combustion chamber 130. The interior of the tubular part 132 has a terraced effect presenting an upper level 144 bounded at the inner margin by the sharp cornered hexagonal opening 142; the floor 140 of the hexagonal opening forms a lower level which is bounded at the inner margin or periphery by the sharp edged mouth of the passage 136.

During the cranking operation of the engine previously referred to, the core 138 of the jet of sprayed fuel from the spray tip 122 passes diametrically across the pre-combustion chamber 130, thence to within the sharp edges bounding the mouth of the passage 136 and proceeds directly into the main combustion chamber of the engine which is indicated at 146 and is bounded by the centrally bossed piston 52 at the bottom and by the head 76 at the top. The vaporous disintegration portion of the jet indicated at 148 surrounds the core 138 during cranking and impinges generally on the floor 140 of the hexagonal tool receiving recess 142. The coaxial relationship between the smooth-bored passage 136 and the nozzle tip 122 are of great benefit during the cranking operation of the engine as already noted. The unique arrangement of the upstanding tubular part 132 has further significance during the normal running operation of the engine. Thus it will be seen that the terraced effect presented by the upstanding tubular part 132 presents the set of vertically spaced sharp cornered transverse surfaces at 144 and 140 which tend to cause turbulence and atomization of the spray pattern of fuel. In addition, the upstanding upper end of the tubular part 132 is isolated at all points as by a gap 150, Figure 3, from direct contact with the metal 116, 128 exposed to the cooling chamber 112 and thus tends to be maintained at relatively high temperature which adds to the atomization effect upon the sprayed pattern of fuel droplets.

For a more complete understanding of the running operation of the engine reference may be had to sequential Figures 4, 5 and 6 in the drawing. A clockwise rotation is assumed of the crank shaft 38 as it rotates in the plane 26 of the cylinders. In Figure 4, upward movement of the ringed piston 52 causes the creation of a relatively high compression pressure on the air within the main combustion chamber 134. Accordingly, the thus highly compressed air forces its way through the passage 136 in the tubular part 132 and is introduced into the relatively lower pressures of the spherical pre-combustion chamber 130.

Like numerals are used in Figures 4, 5, and 6 consistent with the numerals of Figures 1, 2 and 3 and accordingly the piston is indicated at 52 in Figure 5 and as seen near top dead center position is in close relationship to the lower surface of the head 76 so as to reduce the volume of the pre-combustion chamber 134 to a limited amount. The relationship of parts in Figure 5 corresponds to a piston position of approximately 10° to 6° before top dead center and it is in this piston position in one contemplated embodiment of the invention that injection starts from the nozzle tip 122. The strong upward rush of the column of air through the concentric smooth bored passage 136 and the tubular upstanding part 132 prevents any fuel from immediately entering the passage and accordingly the turbulence and eddies of impinging fuel are confined to areas within the pre-combustion chamber 130. The fuel droplets sharply impinge upon the terraced transverse surfaces previously noted in the upper end 132 of the tubular upstanding part and the sharp edges of such terraced surfaces further accentuate the atomization process.

Ignition in the pre-combustion chamber is initiated almost simultaneously at point of injection in accordance with the showing of Figure 5 and ultimately the pressures in the pre-combustion chamber reach a subsequent point at which to overcome the residual momentum of the upwardly flowing air through the tubular part 132. Thereupon and in accordance with Figure 6, the prevailing pressure in the precombustion chamber 132 exceeds the pressure in the combustion chamber 134 and a jet of flaming gases is blown unimpededly downwardly through the tubular part 132 and into the main combustion chamber 134. A toroidally outwinding circulation of air results within the main combustion chamber 134 and is best seen for its circulation pattern in Figure 1. Thus with respect to the central axis 28, the circulation to the left of center is clockwise toward the slightly protruding lower end 134 of the part 132 and toward the right of center the direction of circulation is counter-clockwise. The result according to Figure 6 is that the flaming jet of fuel which issues through the lower depending portion 134 is fed oxygen by the toroidally inwinding mass of air within the combustion chamber 146 and tends to be continually supported as the combustion process proceeds until all of the fuel is effectually consumed.

It is to be particularly noted that with the selected length-to-diameter ratio of the sole intercommunicating passage 136 already pointed out, there is no excessive restriction offered to free communication between the pre-combustion chamber 130 and the main combustion chamber 146 and no group of highly resistive offcenter distributing passages is present as with other prevalent pre-combustion type designs.

As herein disclosed the invention is shown and described in connection with a multi-cylinder engine. It is evident, however, that all of the inherent advantages can be successfully utilized in a precombustion type diesel engine of single cylinder construction. So also the drawing shows a wet liner type cylinder within which these various advantages are achieved but self-evidently in cases where excessive liner wear is not anticipated the pistons may be reciprocally received directly against the surfaces of the interior walls of the cylinders in the block. The noncircular tool receiving counter-opening or socket 142 is shown to be hexagonal but indeed it is not essential to the invention that a hexagonal shape be specifically utilized and other polygonal or noncircular shaped recesses suited to appropriate tools may be used and, within the broader phases of the invention, an elliptical or elongated slot may be utilized to provide the socket 142.

Variations within the spirit and scope of the invention described are equally comprehended by the foregoing description.

What is claimed is:

1. In combination, an engine cylinder, a piston movable therein, a fixed cylinder head structure coaxial with the cylinder and piston and having a near end cooperating therewith to define a varying sized main combustion chamber depending on the position assumed by the movable piston, said head structure having a remote end for receiving an injector nozzle, a central opening in the near end of the head structure disposed so as to be coaxial with the nozzle, means providing a spherically formed pre-combustion chamber between the ends of the head structure and having diametrically opposed openings one in registry with the nozzle and the other in registry with the cylinder head opening, and a centrally passaged member received in said other of said registered openings and having a tubular upstanding part within and spaced from the walls of the spherical pre-combustion chamber at all points, said upstanding tubular part of the centrally passaged member having a plurality of vertically spaced apart terraced surfaces one providing a sharp cornered mouth for the noted central passage, another of said terraced surfaces defining a sharp cornered marginal edge for a non-circular counter socket surrounding the mouth of the passage for receiving a complementary noncircular tool, the body of said centrally passaged member being externally threaded for threadably engaging the adjacent surface of said other of said registered openings.

2. In combination, an engine cylinder, a piston movable therein, a fixed cylinder head structure coaxial with the cylinder and piston and having a near end cooperating therewith to define a varying sized main combustion chamber depending on the position assumed by the movable piston, said head structure having an outer end defining a position for an injector nozzle, a central opening in the near end of the head structure disposed so as to be coaxial with the position of the nozzle, means providing a spherically formed precombustion chamber between the ends of the head structure and having diametrically opposed openings one in registry with the position to be assumed by the nozzle and the other in registry with the cylinder head opening, and a centrally passaged member received within and engaging the latter said registered openings and having a tubular upstanding part within and spaced from the walls of the spherical pre-combustion chamber at all points, said upstanding tubular part of the centrally passaged member having a relatively inner and a relatively outer transverse surface each concentric to said central passage and at a level above all points of engagement between said centrally passaged member and the registered openings, one of said transverse surfaces providing a sharp cornered mouth for the noted central passage, another of said transverse surfaces defining a sharp cornered marginal edge for a noncircular counter socket surrounding the mouth of the passage for receiving a complementary noncircular tool, the body of said centrally passaged member being externally threaded for threadably engaging the adjacent surface of one of said registered openings.

3. In combination, an engine cylinder, a piston having an upwardly protruding tapered central boss and movable up and down in the cylinder, a fixed cylinder head structure coaxial with the cylinder and piston and having a lower end cooperating therewith to define a varying sized main combustion chamber depending on the position assumed by the piston, said head structure having an upper end defining a position for an injector nozzle, a central opening in the lower end of the head structure disposed so as to be coaxial with the position assumed by the nozzle, means providing a spherically formed pre-combustion chamber between the ends of the head structure and having diametrically opposed openings one in registry with the position of the nozzle and the other in registry with the cylinder head opening, and a centrally passaged member received in the latter of said registered openings and having a tubular upstanding part within and spaced from the walls of the spherical pre-combustion chamber at all points, said tubular upstanding part of the centrally passaged member having a plurality of vertically spaced apart terraced surfaces one providing a sharp cornered mouth for the noted central passage, another of said terraced surfaces defining a sharp cornered marginal edge for a noncircular counter socket surrounding the mouth of the passage for receiving a complementary noncircular tube, the body of said centrally passaged member being so formed internally thereof as to have a smooth passage forming bore of uniform cross section within the lower end thereof continuously communicating with the main combustion chamber and arranged to direct a jet concentrically thereinto directly against the opposed central tapered boss on the piston.

4. In combination, an engine cylinder, a piston movable therein, a fixed cylinder head structure coaxial with the cylinder and piston and having an inner end cooperating therewith to define a varying sized main combustion chamber depending on the position assumed by the movable piston, said head structure having an outer end defining a position assumed by an injector nozzle, a central opening in the inner end of the head structure disposed so as to be coaxial with the nozzle position, means providing a chamber of revolution forming a pre-combustion chamber between the opposite ends of the head structure and having opposed openings one in registry with the nozzle position and the other in registry with the cylinder head opening, and a centrally passaged member received in the said other of said registered openings and having a tubular upstanding part within and spaced from the walls of the spherical pre-combustion chamber at all points, said upstanding tubular part of the centrally passaged member having a plurality of vertically spaced apart terraced surfaces one providing a sharp cornered mouth for the noted central passage, another of said terraced surfaces defining a sharp cornered marginal edge for a noncircular counter socket surrounding the mouth of the passage for receiving a complementary noncircular tool, the body of said centrally passaged member being externally threaded for threadably engaging the adjacent surface of the other of said registered openings.

5. In combination, an engine cylinder, a piston movable therein, a fixed cylinder head structure coaxial with the cylinder and piston and having a near end cooperating therewith to define a varying sized main combustion chamber depending on the position assumed by the movable piston, said head structure having a remote end for receiving an injector nozzle and being internally passaged between the ends to provide a jacket adapted to contain water, means having a body portion within and adapted to be cooled by water contained by said jacket and providing a pre-combustion chamber formed according to a path of revolution between the opposite ends of the head structure, said pre-combustion chamber having an end opening in each end of the head structure with one opening being in registry with the nozzle and the other in registry with the main combustion chamber, and a centrally passaged member received in the latter opening and having a tubular upstanding part within and spaced from the walls of the pre-combustion chamber at all points therein, said tubular upstanding part of the centrally passaged member having a plurality of vertically spaced apart terraced surfaces one providing a sharp cornered mouth for the noted central passage, another of said terraced surfaces defining a sharp cornered marginal edge for a noncircular counter socket surrounding the mouth of the passage for receiving a tool.

6. In combination, an engine cylinder, a movable piston therein, a cylinder head structure coaxial with respect to the cylinder and piston and having an inner end cooperating therewith to define a main combustion chamber of a varying size depending on the position assumed by the movable piston, said head structure having an outer end for receiving a nozzle part, means providing a spherically formed pre-combustion chamber between the named ends of the head structure and having diametrically opposed openings one for registering with the nozzle part and the other communicatively connected to the main combustion chamber, and a centrally passaged member internally threadably engaged within said other opening and having a tubular upstanding part within and spaced from the walls of the spherical pre-combustion chamber at all points, said tubular upstanding part of the centrally passaged member having a plurality of vertically spaced apart terraced surfaces with sharp cornered inner margins one providing an outer opening for the noted central passage, another of said sharp cornered inner margins of said terraced surfaces defining the edges of a noncircular counter recess disposed adjacent the outer opening of the passage and adapted to receive a tool.

7. In a cylinder construction, a coaxial piston and cylinder head structure therein which are relatively reciprocal and between which a main combustion chamber intervenes, said head structure having a nozzle carrying end opposite to the end thereof adjacent the piston, means providing a spherically formed pre-combustion chamber disposed concentrically between the ends of the head structure and having diametrically opposed openings one in communication with the main combustion chamber, the other of said openings being a nozzle receiving opening at the opposite end of the head structure, and a centrally passaged member fixed stationarily in said one opening and having a tubular upstanding part within and spaced from the walls of the spherical pre-combustion chamber at all points therein, said tubular upstanding part of the centrally passaged member having a plurality of axially spaced apart terraced surfaces with sets of sharp corners one providing the edges of a noncircular tool receiving recess, another of said terraced surfaces providing the floor of the tool receiving recess with the sharp cornered edges thereof defining the outer mouth of the center passage, the inner mouth of said center passage providing a coaxial opening at the head of the main combustion chamber.

8. In an engine including a main combustion chamber, an engine cylinder surrounding the chamber, a stationary cylinder head structure cooperating with the cylinder and being coaxial therewith to define the head of the main combustion chamber, said head structure having an outer end in which there is a nozzle receiving opening, means providing a spherically formed pre-combustion chamber within the head structure and having diametrically opposed openings one in registry with the nozzle receiving opening in the outer end of the head structure and the other being in communication with the main combustion chamber, and a centrally passaged member received in said latter opening and having a tubular upstanding part within and spaced from the walls of the spherical pre-combustion chamber at all points therein, said tubular upstanding part of the centrally passaged member having a plurality of vertically spaced terraced surfaces with sets of sharp corners one defining the edges of a tool receiving recess, another terraced surface providing the floor of the tool receiving recess with the sharp cornered edges thereof defining the outer mouth of the open-ended central passage in said centrally passaged member, the inner mouth of the central passage being concentrically disposed so as to open directly into the center of the main combustion chamber.

9. In combination, an engine cylinder, a piston movably mounted therein, a cylinder head structure coaxial with the cylinder and piston and cooperating therewith to define a varying sized main combustion chamber depending on the position assumed by the movably mounted piston, said head structure having a remote nozzle carrying end, a central opening in the opposite end of the head structure coaxial with the nozzle carrying end, means providing a chamber of revolution forming a precombustion chamber between the opposite ends of the head structure and having diametrically opposed openings one adapted to receive a nozzle and the other in registry with the main combustion chamber, and a centrally passaged member received in the other of said openings and having a tubular upstanding part within and spaced from the walls of the pre-combustion chamber at all points, said upstanding tubular part of the centrally passaged member having a plurality of terraced surfaces with sets of sharp corners one defining an outer mouth for the noted central passage, one of said terraced surfaces defining a sharp cornered marginal edge for a hexagonally shaped counter opening surrounding the outer mouth of the passage for receiving a tool, the main body of said centrally passaged member being externally threaded for engaging the adjacent surface of said other opening and having the inner mouth of the central passage thereof on a level below the threads and arranged to discharge directly into the main combustion chamber in an axial direction.

10. In combination, an engine cylinder, a movable piston therein, a cylinder head structure coaxial with respect to the cylinder and piston and cooperating therewith at one end to define a varying sized main combustion chamber depending on the position assumed by the piston, said head structure having a remote end adapted to receive an injector nozzle, a central opening located in the near end of the head structure so as to be coaxial with the nozzle, means providing a precombustion chamber between the ends of the head structure and having opposite openings disposed one in each end with one opening in registry with the cylinder head opening, and a hollow member received in said registered openings having a concentric central orifice of uniform cross section and a tubular upstanding part protruding within and spaced from the walls of the pre-combustion chamber at all points, said hollow member having a physical length dimension approximately equal to the axial length of the pre-combustion chamber, said central orifice of the hollow member having a length to diameter ratio in excess of approximately 4:1 and said tubular upstanding part of the hollow member having a plurality of terraced surfaces with sets of sharp corners one providing a sharp edged upper mouth for the noted central orifice, one of said terraced surfaces defining a sharp cornered marginal edge for a noncircular counter opening adjacent the upper mouth of the orifice for receiving a tool, said central orifice having a lower mouth directly within and concentrically related to the main combustion chamber.

11. In combination, an engine cylinder, a piston slidable therein, a cylinder head structure coaxial with the cylinder and piston and cooperating therewith at one end to define a varying sized main combustion chamber depending on the slidable position assumed by the piston, said head structure having an opposite nozzle carrying end and said head structure being internally passaged to provide a jacket adapted to contain cooling water, and means having a body portion within and adapted to be cooled by the water contained by said jacket and providing a pre-combustion chamber formed according to a path of revolution between the opposite ends of the head structure, said pre-combustion chamber having opposed inlet and discharge openings in the opposite ends of the head structure, and a hollow member engageably received in said discharge opening and having a concentric central orifice of uniform cross section and a tubular upstanding part within and spaced from the walls of the pre-combustion chamber at all points therein, said central orifice having a length to diameter ratio of approximately 4:1 and said tubular upstanding part of the hollow member having a relatively inner and a relatively outer transverse surface each coaxial with said central orifice and disposed at a level above the point of engagement between the hollow part and the discharge opening in which it is received, the outer transverse surface having sharp corners defining edges for a noncircular tool receiving recess and the inner transverse surface providing a floor for the recess and having sharp corners defining the mouth for the central orifice which opens therein.

12. In an internal combustion engine having a cylinder providing a main combustion chamber, a cylinder head structure stationarily fixed to close the combustion chamber, said head structure having a pair of axially spaced apart opposite ends one forming the top of the combustion chamber and the other being a nozzle carrying end, means providing a pre-combustion chamber formed according to a path of revolution between the opposite ends of the head structure and having spaced apart openings disposed one in each end with one opening adapted to register with the combustion chamber, and a hollow member received in said latter opening having an axially disposed central orifice of uniform cross section and a tubular upstanding part protruding within and spaced from the walls of the pre-combustion chamber at all points therein, said hollow member having a physical length dimension approximately equal to the measured axial length of the pre-combustion chamber, said central orifice of the hollow member having a length-to-diameter ratio in excess of approximately 4 to 1 and said tubular upstanding part of the hollow member having a plurality of vertically spaced apart terraced surfaces provided with sets of sharp corners with one set providing a sharp edged upper mouth for the noted central orifice, one of said terraced surfaces defining a sharp cornered marginal edge for a noncircular counter opening adjacent the upper mouth of the orifice for receiving a tool, said central orifice having a lower mouth arranged for a disposition directly within and in concentric communicative relationship to the main combustion chamber.

13. In an internal combustion engine having a cylinder providing a main combustion chamber, a cylinder head structure having a pair of axially spaced apart opposite ends one for closing the combustion chamber and the other being a nozzle carrying end, means providing a pre-combustion chamber formed according to a path of revolution between the opposite ends of the head structure and having an opening disposed one in each end of the head structure with one opening adapted to register with the main combustion chamber, and a hollow member received in the last said one opening having a single orifice therethrough and a tubular upstanding part protruding within and spaced from the walls of the pre-combustion chamber at all points therein, said hollow member having a physical length dimension approximately equal to the axial length of the pre-combustion chamber, said single orifice of the hollow member having a length-to-diameter ratio in excess of approximately 4 to 1 and said tubular upstanding part of the hollow member having first and second terraced surfaces provided with sets of sharp corners with the set of corners of the first surface providing a sharp edged upper mouth for the noted single orifice, the second of said terraced surfaces defining a sharp cornered marginal edge for a noncircular counter opening adjacent the upper mouth of the orifice for receiving a tool, said single orifice having a smooth bore of uniform cross section and lower mouth therefor arranged for a disposition directly within and in communicative concentric relationship to the main combustion chamber.

14. In a pre-combustion diesel engine, an engine cylinder member having a cylinder space, a cylinder head forming one end of the cylinder space, a piston reciprocable within said cylinder space and having a protrusion in the piston head concentric with the cylinder space, an insert member intermediate the cylinder head and the piston, said member having straight passage means having an outlet establishing communication with said cylinder space, a pre-combustion chamber in said cylinder head providing a jet discharge into said passage means and through said outlet in a plane in closely spaced adjacency to said protrusion on the piston head in the upper dead center position of said piston, said insert member having its inlet end protruding into said precombustion chamber and with the core of the jet issuing initially into the space in a direction coaxial with said piston and with said cylinder space.

15. In a pre-combustion diesel engine provided with a piston having a local protrusion in the head thereof, the combination of an engine cylinder member having a cylinder space for reciprocably receiving the piston, a cylinder head forming one side of the cylinder space, an insert member in the cylinder head having a single straight passage establishing the sole communication therethrough to said cylinder space, a pre-combustion chamber in said cylinder head discharging longitudinally of the cylinder space through said straight passage in a plane arranged to be in closely spaced juxtaposition to the protrusion on said piston when in its upper dead center position, and said insert member having its inlet end protruding into said pre-combustion chamber.

16. In a pre-combustion diesel engine, an engine cylinder member having a cylinder space, a cylinder head forming one end of the cylinder space, a piston reciprocable within said cylinder space and having a protrusion in the piston head concentric with the cylinder space, an insert member intermediate the cylinder head and the piston, said member having straight passage means having an outlet establishing communication with said cylinder space, a pre-combustion chamber in said cylinder head providing a jet discharge into said passage means and through said outlet in a plane in closely spaced adjacency to said protrusion on the piston head in the upper dead center position of said piston, said insert member presenting a sharp mouthed inlet end toward said jet discharge, and with the core of the jet issuing initially into the space in a direction coaxial with said piston and with said cylinder space.

17. In a pre-combustion diesel engine provided with a piston having a local protrusion in the head thereof, the combination of an engine cylinder member having a cylinder space for reciprocably receiving the piston, a cylinder head forming one side of the cylinder space, an insert member in the cylinder head having a single straight passage establishing the sole communication therethrough to said cylinder space, a pre-combustion chamber in said cylinder head discharging longitudinally of the cylinder space through said straight passage in a plane arranged to be in closely spaced juxtaposition to the protrusion on said piston when in its upper dead center position, and said insert member presenting a sharp mouthed inlet end toward said jet discharge.

References Cited in the file of this patent

UNITED STATES PATENTS

| 1,406,877 | Lemaire | Feb. 14, 1922 |

FOREIGN PATENTS

| 436,824 | Great Britain | Oct. 18, 1935 |
| 130,007 | Austria | Oct. 25, 1932 |
| 144,416 | Australia | Dec. 7, 1951 |